No. 821,608. PATENTED MAY 29, 1906.
A. V. CARROLL.
ATTACHMENT FOR INCREASING THE SWING OF LATHES.
APPLICATION FILED SEPT. 14, 1904.
2 SHEETS—SHEET 2.
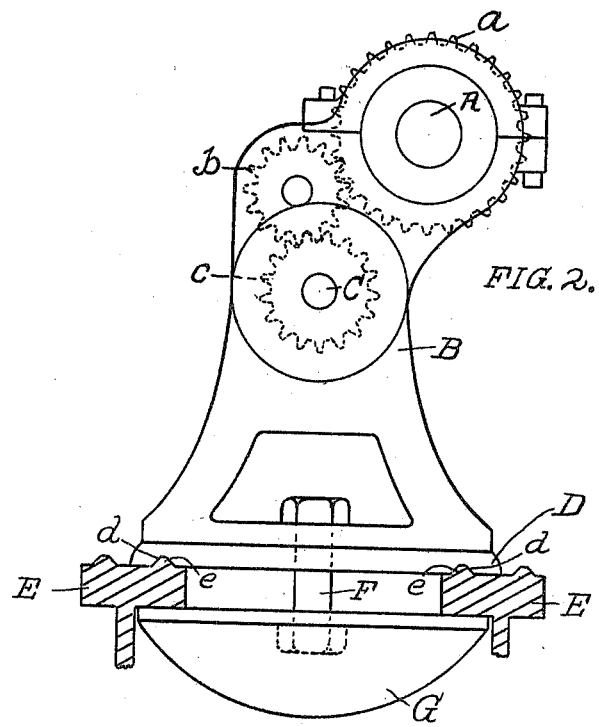
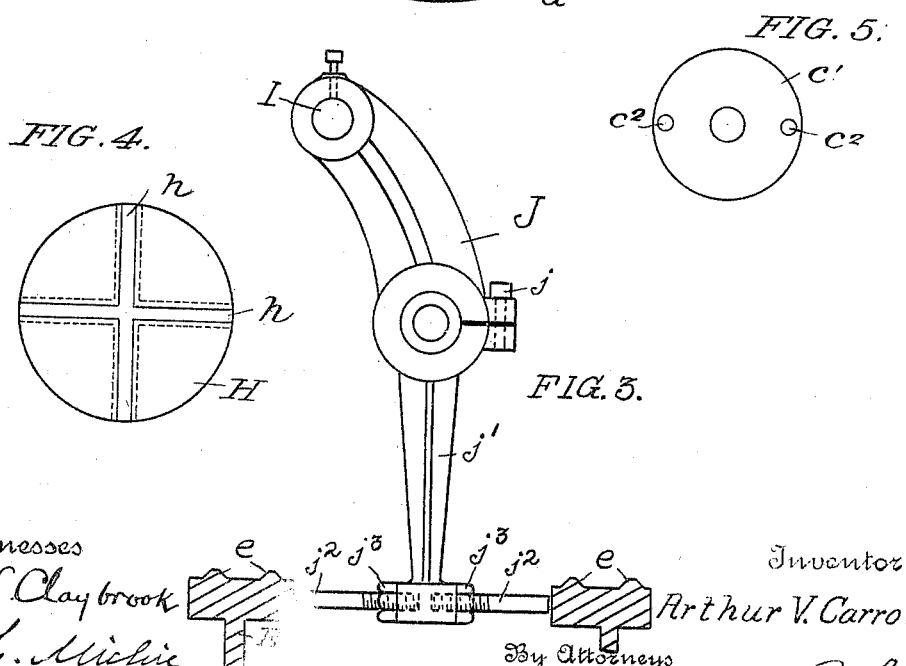
Witnesses
J. N. Claybrook
T. L. Michie
Inventor
Arthur V. Carroll
By Attorneys
Parkinson & Richards

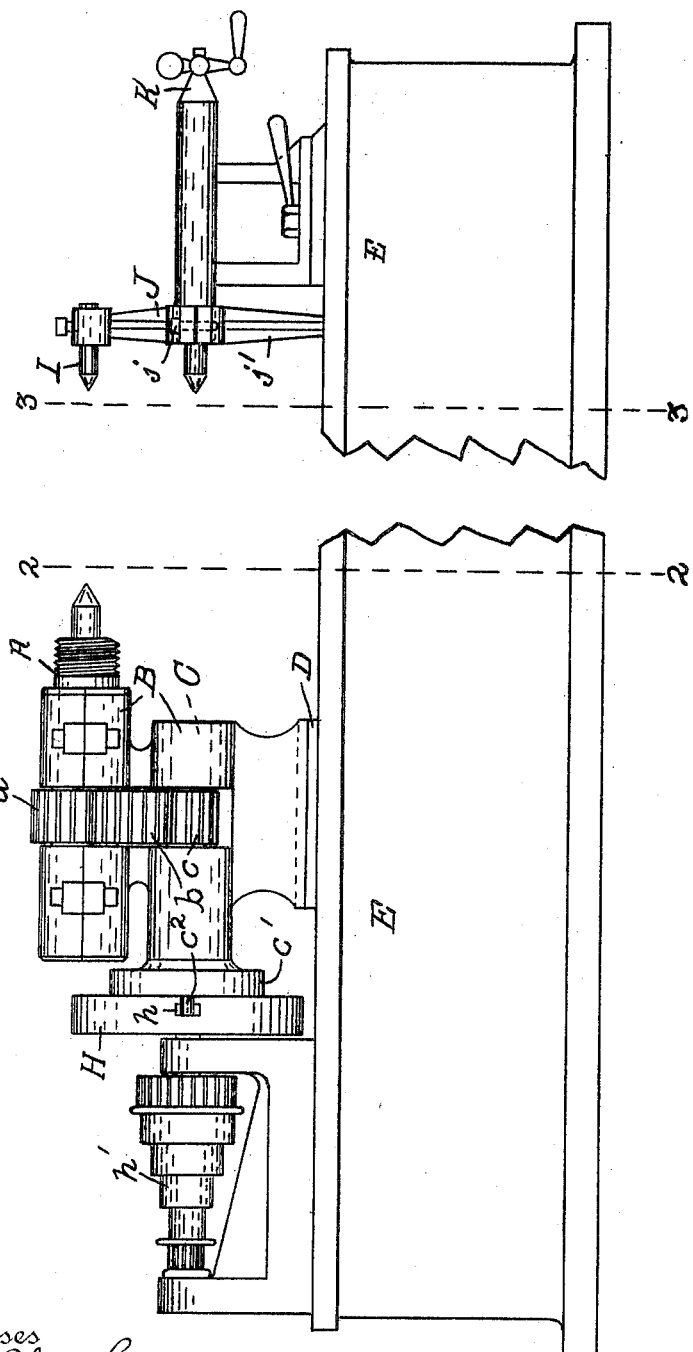

UNITED STATES PATENT OFFICE.

ARTHUR V. CARROLL, OF BATAVIA, OHIO.

ATTACHMENT FOR INCREASING THE SWING OF LATHES.

No. 821,608.　　　　Specification of Letters Patent.　　　Patented May 29, 1906.

Application filed September 14, 1904. Serial No. 224,377.

*To all whom it may concern:*

Be it known that I, ARTHUR V. CARROLL, a citizen of the United States, residing at Batavia, in the county of Clermont and State of Ohio, have invented a certain new and useful Attachment for Increasing the Swing of Lathes, of which the following is a specification.

The object of my invention is to provide an attachment for increasing the swing of lathes; and my invention consists in the combination and arrangements of parts hereinafter described and claimed.

In the drawings, Figure 1 is a side view of portions of the bed of a lathe equipped with an attachment embodying my invention; Fig. 2, a section, on an enlarged scale, on line 2 2 of Fig. 1; Fig. 3, a section, on an enlarged scale, on line 3 3 of Fig. 1; Fig. 4, an elevation of the face-plate of the lathe, and Fig. 5 an elevation of the attachment-plate which is driven by the lathe face plate.

A supplemental live lathe-spindle A is mounted in a frame B and geared to a shaft C by means of gears $a$ $b$ $c$. The frame B carries base-plate D, having grooves $d$, adapted to take over the shears or ways $e$ on the lathe-bed $e$. A bolt F, passing through the base $b$, base-plate D, and clamp G, serves to secure the frame B to the lathe-bed E. At one end shaft C is provided with a plate $c'$, carrying pins $c^2$, which are adapted to engage the usual slots $h$ in face-plate H of the lathe, and thus cause the supplemental spindle A to be driven by the regular live lathe-spindle. The face of plate $c'$, fitting against the face of face-plate H, tends to give and maintain true alinement between the live lathe-spindle $h'$ and shaft C, while the engagement between pins $c^2$ and slots $h$ permits adjustment to obtain a true alinement between spindle $h'$ and shaft C. Gear $a$ is made larger than gear $c$, so as to reduce the speed of spindle A. By making the base-plate D to fit the shears of any particular lathe and by varying its thickness to bring shaft C in alinement with the regular live-spindle the frame B may be mounted on lathes of different construction. The spindle A is set in a vertical line behind the vertical line through spindle $h'$, so as to facilitate work on a larger diameter.

A center piece I is mounted in frame J, which is provided with a split hub and bolt $j$ for securing it to the usual dead lathe-spindle K, with center piece I in alinement with supplemental spindle A. The frame J is provided with an arm $j'$, extending down between the lathe-shears, and carries adjustable transverse shafts $j^2$, which slide on the sides of the lathe-bed and prevent turning of the frame J. Jam-nuts $j^3$ serve to lock shafts $j^2$ in position to contact with the sides of the bed E. Owing to the fact that the center piece I is carried by the dead lathe-spindle, which is in turn carried by the tail-stock of the lathe, the center piece I is endowed with all the adjustments of which the regular dead-center of the lathe is capable.

It will be seen that work may be mounted between the supplemental spindle A and the center piece I just as between the regular spindle and dead-center of the lathe, and that the swing of the lathe is thereby increased by the difference between the heights of the supplemental and regular live lathe-spindles above the bed.

While I have shown and described the preferred construction for carrying my invention into effect, this is capable of modification without departing from the spirit of my invention. I therefore do not wish to be limited to the exact construction shown; but

What I claim as new, and desire to secure by Letters Patent, is—

1. In a lathe, the combination of a frame; a base-plate adapted to be secured to said frame and to a lathe-bed; means for detachably securing said base-plate to the frame and the lathe-bed; a shaft rotatably mounted in said frame; a crank-pin carried by said shaft and adapted to engage a slot in a face-plate on the live lathe-spindle; a supplemental live lathe-spindle mounted in said frame at a higher elevation than the regular live lathe-spindle; and a driving connection between said shaft and said supplemental live lathe-spindle; substantially as specified.

2. In a lathe, the combination of a frame adapted to be secured to a lathe-bed; a shaft rotatably mounted in said frame; a crank-pin carried by said shaft and adapted to engage a slot in a face-plate on the live lathe-spindle; a supplemental live lathe-spindle mounted in said frame at a higher elevation than the regular live lathe-spindle; and a driving connection between said shaft and said supplemental live lathe-spindle, substantially as specified.

3. In a lathe, the combination of a frame adapted to be secured to a lathe-bed; a shaft rotatably mounted in said frame; a plate carried by said shaft and provided with noncentral pins adapted to engage slots in a face-plate on the live lathe-spindle; a supplemental live-lathe spindle mounted in said frame at a higher elevation than the regular live lathe-spindle; and a driving connection between said shaft and said supplemental live lathe-spindle, substantially as specified.

4. In a lathe, the combination of frame B carrying supplemental spindle A and shaft C; gears $a$, $b$ and $c$ connecting spindle A and shaft C; base-plate D having grooves $d$; clamp G and bolt F for securing frame B to the lathe-bed; plate $c'$ carrying pins $c^{2\prime}$; and face-plate H on the regular live lathe-spindle, substantially as specified.

5. A lathe attachment comprising a frame J having a split hub adapted to engage the dead lathe-spindle; bolt $j$ for securing frame J to said spindle; dead-center piece I carried by frame J; and arm $j'$ constructed to have sliding connection with the lathe-bed, substantially as specified.

ARTHUR V. CARROLL.

Witnesses:
BRAYTON G. RICHARDS,
AGNES B. GRANT.